Patented July 8, 1952

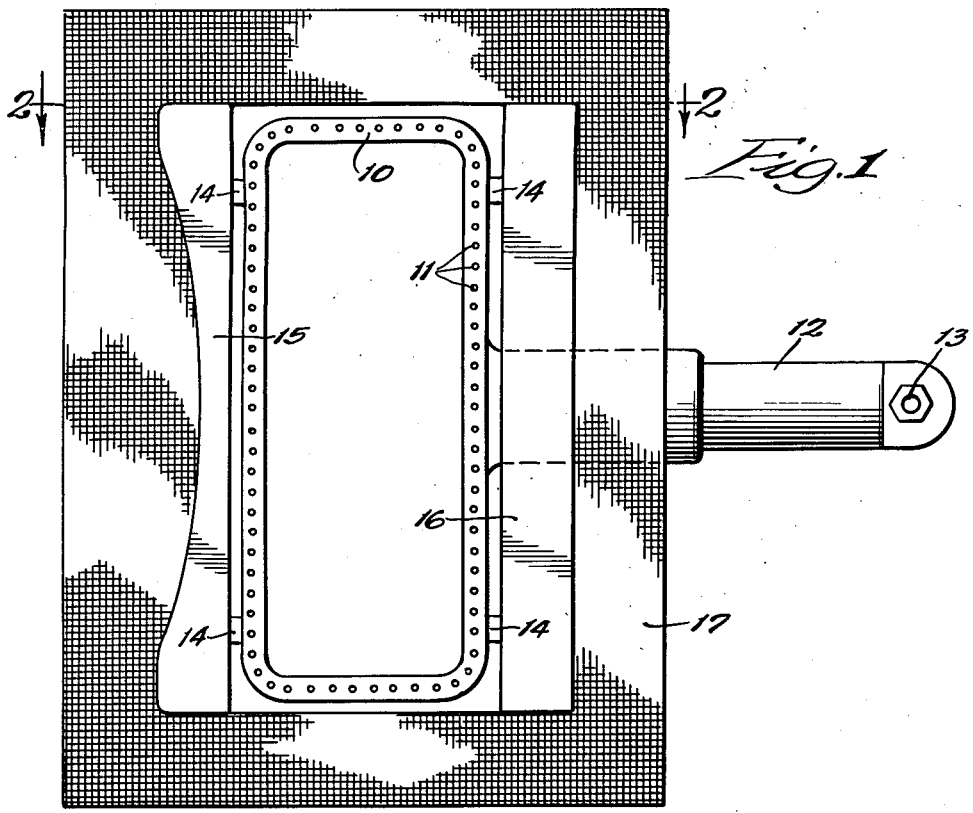
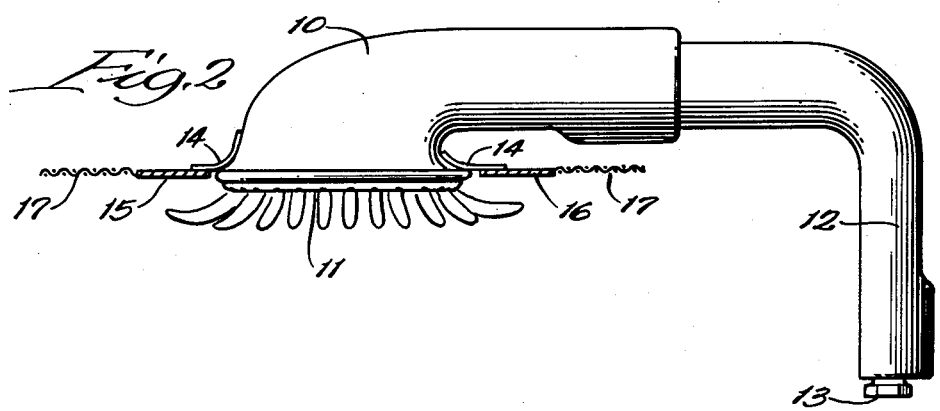

2,602,497

UNITED STATES PATENT OFFICE 2,602,497

GAS FUELED BROILER BURNER WITH SOLID AND FORAMINOUS FLAME BAFFLE

Conrad J. Buhman and James A. Nelson, Chicago, Ill., assignors to Cribben and Sexton Company, Chicago, Ill., a corporation of Illinois Application March 12, 1947, Serial No. 734,116

1 Claim. (Cl. 158—113)

This invention relates to a cooking device. It is particularly useful as a broiler, toaster and the like.

In a broiler device or flame heated toaster, one important object is to achieve a high temperature quickly, and another object is to obtain even heat distribution on the grill. It is known that the addition of radiant material about the burner ports will increase the temperature at the broiling plane and thus achieve the high temperature or "charcoal" broil effect. If the radiant material has too much mass, it will slow down the temperature rise during the pre-heat period. This would be a slow broiler and would not be desirable. The most desirable radiant material is one having a relatively small mass such as a wire platform or screen having low mass, good "radiant glow" equalities, and, if made of a heat resistant material, long life.

The provision of wire mesh or screen, however, about the usual broiler burner results in a non-uniform application of heat and tends to magnify the concentration of heat upon the broiling plane near the center of the sides of the burner while the screen at the end portions of the burner provides relatively cooler areas. The burner, therefore, by reason of its magnifying of the unequal heat pattern, gives very unsatisfactory results.

An object of the present invention is to provide a structure whereby radiant heating material of low mass may be employed with the broiler burner while, at the same time, providing means for correcting the bad heat pattern and producing an even distribution of heat. Another object is to provide in combination with a gas burner and screen, a flame spreader which produces an even distribution of heat without reducing the "radiant glow" and quick heating properties of the screen. Other specific objects and advantages will appear as the specification proceeds.

The invention is illustrated, in a preferred embodiment, by the accompanying drawing, in which—

Figure 1 is a bottom plan view of apparatus embodying our invention; Fig. 2, a transverse sectional view, the section being taken as indicated at line 2 of Fig. 1.

In the illustration given, 10 designates a gas burner having at its bottom side gas ports 11 which direct the gas and resultant flame downwardly and also laterally. Extending from the burner 10 is the mixer pipe 12 provided at its lower end with a gas orifice 13. Since such structure is well known, a detailed description is here believed to be unnecessary.

Supported upon the lower flange of the burner 10 are metal strips 14 supporting the spreader plates 15 and 16. Encircling the spreader plates 15 and 16 and welded thereto is a wire network or screen 17. It will be understood that the flame spreaders 15 and 16 and the screen 17 may be supported in any suitable manner in general alignment with the bottom burner 10.

Operation

In the operation of the device, a mixture of air and gas is supplied through the pipe 12 to burner 10 and discharged through the burner openings 11. The spreader plates 15 and 16 control the shape of the flame and produce the desired pattern of flame about the burner. Plate 15 has outwardly flared corner portions and a relatively narrow inner portion, and this shape overcomes the tendency of the burner to concentrate the heat on the broiling plane near the center of the burner sides and, instead, causes the heat to be distributed as much toward the ends of the broiling plane as toward the center. It will be understood that the shape of the flame spreaders 15 and 16 may be varied widely, as desired, to produce the pattern which is most effective for the broiling or toasting operation desired. The effect of the spreader plates is to extend the flames at certain portions of the burner and thereby to increase the radiant effect at these points. This control of the heat pattern is accomplished without losing the desired quick heating or "charcoal" broil effect of the screen.

By providing flame spreaders of special design, it is possible to utilize burners of various shapes which are found to be most efficient as burners while, at the same time, enabling screen or wire mesh of small mass to be utilized fully for its "radiant glow" characteristics.

The cooking device or broiler described may be placed within the broiler compartment of a gas range or in any other suitable cooking device and utilized as a broiler, toaster, and for a number of other uses.

While in the foregoing specification, we have set forth one specific structure in considerable detail for the purpose of illustrating one embodiment of the invention, it will be understood that such details may be varied widely by those skilled in the art without departing from the spirit of our invention.

We claim:

A broiler device, comprising a gas burner having a downwardly-turned head with openings therein along its lower side for directing flames outwardly, a flame-spreader plate supported by said head with its inner edge adjacent the side of the burner and extending in horizontal alignment with the lower portion of said burner head, whereby the lower surface of said plate is adapted to be engaged by the flames of said burner, and a screen enclosing the ends and outer side of said flame-spreader plate and contiguous therewith, said screen being supported by said spreader plate in horizontal alignment therewith, said flame-spreader plate having a concave outer edge providing a central portion of relatively narrow width while providing narrow end portions enclosed by said screen.

CONRAD J. BUHMAN.
JAMES A. NELSON.

REFERENCES CITED

The following references are of record in the file of this patent:

UNITED STATES PATENTS

| Number | Name | Date |
|---|---|---|
| 1,583,362 | Ostendorg | May 4, 1926 |
| 1,614,746 | Lyon | Jan. 18, 1927 |
| 2,132,021 | Forster | Oct. 4, 1938 |
| 2,235,886 | Kahn | Mar. 25, 1941 |

FOREIGN PATENTS

| Number | Country | Date |
|---|---|---|
| 366,149 | Great Britain | Feb. 4, 1932 |